United States Patent
Hawkins et al.

(10) Patent No.: US 8,245,851 B2
(45) Date of Patent: Aug. 21, 2012

(54) NONCIRCULAR REPLACEABLE FUEL FILTER ELEMENTS AND SYSTEMS INCLUDING THE SAME

(75) Inventors: Charles W. Hawkins, Sparta, TN (US); Jeffrey A. Husband, Cookeville, TN (US); Mark Wieczorek, Cookeville, TN (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 858 days.

(21) Appl. No.: 11/986,894

(22) Filed: Nov. 27, 2007

(65) Prior Publication Data

US 2009/0134087 A1   May 28, 2009

(51) Int. Cl.
*B01D 27/08* (2006.01)
*B01D 29/15* (2006.01)
*B01D 35/30* (2006.01)
*B01D 27/00* (2006.01)
*B01D 35/00* (2006.01)

(52) U.S. Cl. .................. 210/438; 210/437; 210/497.01; 210/451

(58) Field of Classification Search .................. None
See application file for complete search history.

(56) References Cited

U.S. PATENT DOCUMENTS

| | | | |
|---|---|---|---|
| 4,349,434 A | 9/1982 | Jaworski | |
| 4,853,123 A | 8/1989 | Hayes et al. | |
| 5,900,140 A * | 5/1999 | Nagai et al. | 210/85 |
| 5,902,480 A | 5/1999 | Chilton et al. | |
| 6,045,693 A | 4/2000 | Miller et al. | |
| 6,110,365 A | 8/2000 | Bartels et al. | |
| 6,146,527 A | 11/2000 | Oelschlaegel | |
| 6,270,659 B1 | 8/2001 | Bagci et al. | |
| 6,387,162 B1 | 5/2002 | Kosmider et al. | |
| 6,387,259 B1 | 5/2002 | Roll | |
| 6,554,140 B2 | 4/2003 | Steger, Jr. et al. | |
| 6,723,239 B2 | 4/2004 | Maxwell | |
| D499,177 S | 11/2004 | Kosmider et al. | |
| 6,884,349 B1 | 4/2005 | Jiang | |
| 6,988,625 B2 | 1/2006 | Thomas et al. | |
| 7,282,077 B2 | 10/2007 | Honisch et al. | |
| 2005/0086918 A1 * | 4/2005 | Honisch et al. | 55/498 |

OTHER PUBLICATIONS

International Searching Authority. PCT International Search Report and Written Opinion of the International Searching Authority, PCT/US2008/006550, Aug. 21, 2008.

* cited by examiner

*Primary Examiner* — Nam Nguyen
*Assistant Examiner* — Madeline Gonzalez
(74) *Attorney, Agent, or Firm* — Hamre, Schumann, Mueller & Larson, P.C.

(57) ABSTRACT

One embodiment is a filter assembly wherein the shape of the filter is a non-circular geometry. Other embodiments include unique apparatus, devices, systems, and methods to remove contaminates from a flow of fuel while at the same time providing a unique filter and filter assembly geometry. Further embodiments, forms, objects, features, advantages, aspects, and benefits of the present application shall become apparent from the detailed description and figures included herewith.

21 Claims, 6 Drawing Sheets

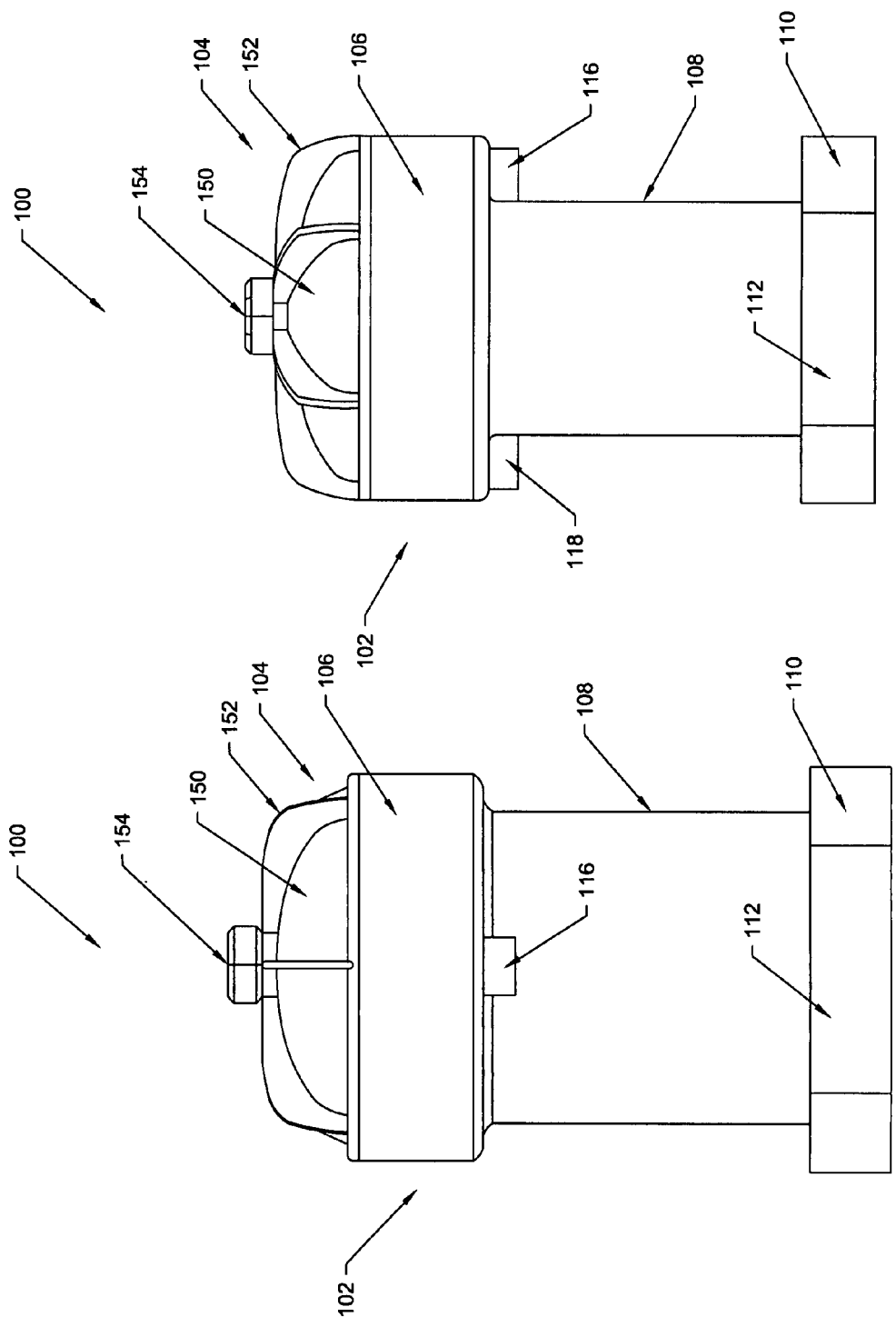

NONCIRCULAR REPLACEABLE FUEL FILTER ELEMENTS AND SYSTEMS INCLUDING THE SAME

FIELD OF THE INVENTION

The present invention relates generally to filter elements and more particularly, to noncircular replaceable filter elements and systems including the same.

BACKGROUND

Fuel filters are found in almost all modern internal combustion engines in one form or another. A fuel filter is a filter that is placed at some point in the fuel line and is designed to remove unwanted contaminates or particulates from the supply of fuel. If these contaminates are not removed before the fuel enters the engine, they can cause rapid wear and failure of such items as fuel pumps, injectors, and cylinders due to the abrasive action of the particles on high-precision components. Fuel filters also can improve performance of the engine, as the less contaminants in the fuel, the more efficiently it can be burned. In many potential engine system designs space constraints would not allow for a conventional circular filter element.

SUMMARY

One embodiment is a filter assembly wherein the shape of the filter is a non-circular geometry. Other embodiments include unique apparatus, devices, systems, and methods to remove contaminates from a flow of fuel while at the same time providing a unique filter and filter assembly geometry. Further embodiments, forms, objects, features, advantages, aspects, and benefits of the present application shall become apparent from the detailed description and figures included herewith.

BRIEF DESCRIPTION OF THE FIGURES

FIG. 2 is a front view of FIG. 1.

FIG. 3 is a side view of FIG. 1.

DETAILED DESCRIPTION

Figure 1:
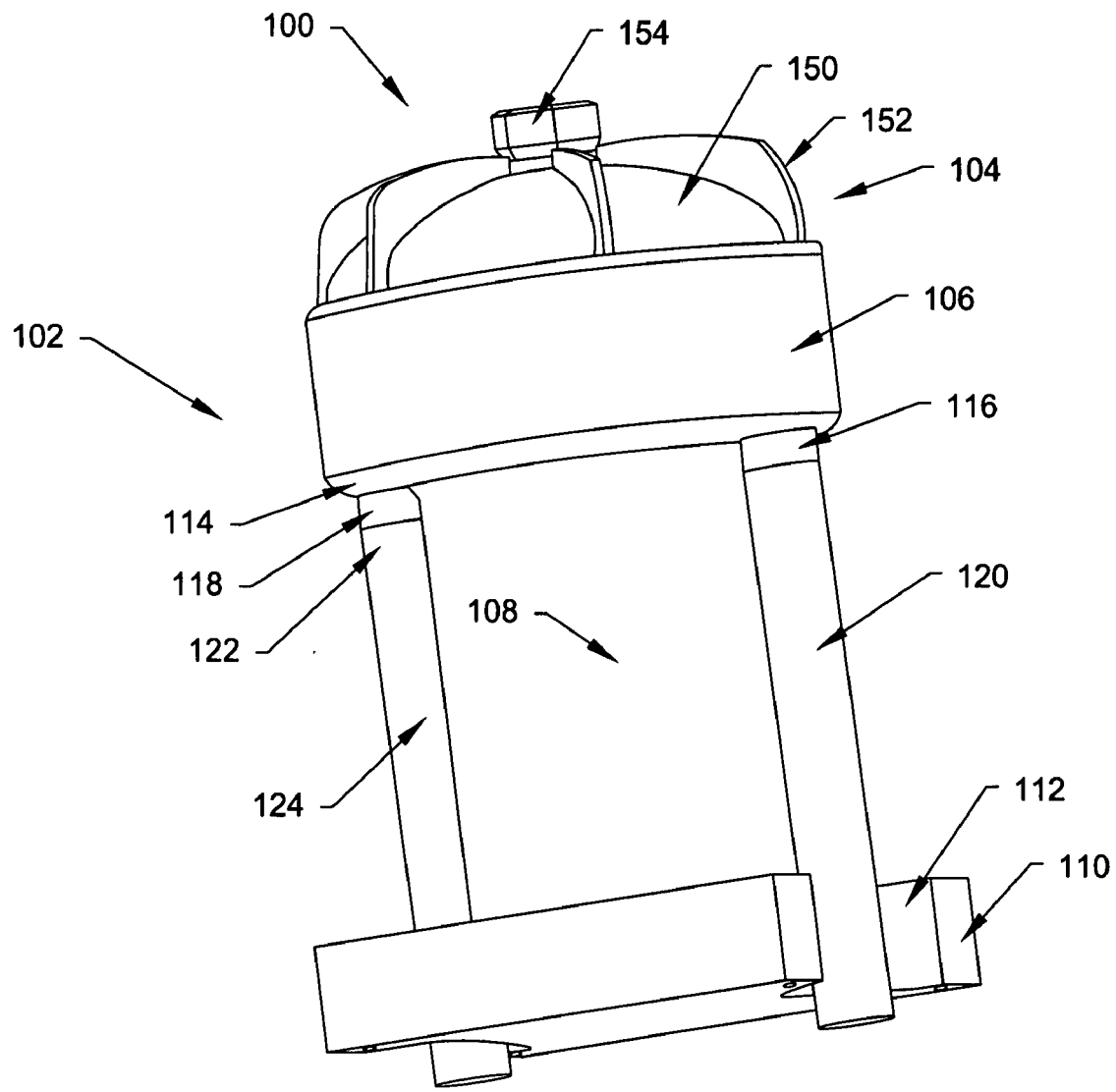
FIG. 1 is a perspective view of an exemplary fuel filter assembly.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

With reference to FIGS. 1-3, there is illustrated a fuel filter assembly 100 including a housing 102 and a lid 104 removably connected with an upper portion of the housing 100. Housing 102 includes an upper segment or portion 106, a central segment or portion 108, and a lower mounting surface segment or portion 110. In one embodiment, upper portion 108 of housing 102 has a generally circular cross-section shape and central portion 108 has a generally non-circular cross-section shape. The lower mounting surface portion 110 of housing 102 has ends that include partially circular shaped recessed portions 112 which provide space for fluid connections to be connected with filter assembly 100.

The upper portion 106 of housing 102 includes a shelf portion 114 that is defined at a point where the upper portion 106 of housing 102 transitions into central portion 108 of housing 102. As illustrated, shelf portion 114 of housing 102 extends outwardly from the non-circular central portion 108 of housing 102 a predetermined distance. The shelf portion 114 includes a fuel inlet port 116 and a fuel outlet port 118. In the illustrated example, fuel inlet port 116 and fuel outlet port 118 are located at opposite sides of shelf portion 114 of housing 102.

Fuel inlet port 116 and fuel outlet port 118 are positioned substantially parallel in relation to a vertical axis of housing 102. The non-circular cross-sectional shape of central portion 108 of housing 102 provides extra space under upper portion 106 of housing 102. This extra space is used for fluid connection ports 116, 118. A fuel supply line 120 is connected with fuel inlet port 116 in a vertical direction or orientation in relation to the vertical axis of the housing 102. Fuel supply line 120 is used to supply fuel or fluid to filter assembly 100. Fuel enters filter assembly 100 through fuel supply line 120 where it is filtered by filter assembly 100, and the filtered fuel then exits filter assembly 100 through fuel outlet port 118.

In one embodiment, a fuel regulator valve 122 is connected with fuel outlet port 118. Fuel regulator valve 122 is designed to open at a predetermined pressure level, for example 60 PSI, so that fuel will only exit filter assembly 100 through fuel outlet port 118 once a predetermined amount of pressure exists in filter assembly 100. Fuel regulator valve 122 is connected with a fuel or fluid return line 124. Although not illustrated, return line 124 may be in fluid communication with a fuel tank or reservoir or an engine. As with fuel supply line 120, fuel regulator valve 122 and fuel return line 124 are connected with fuel outlet port 118 in a vertical direction or orientation in relation to the vertical axis of housing 102.

The exemplary non-circular cross-section shape of the central portion 108 of housing 102 provides extra space under upper portion 106 of housing 102 thereby allowing fluid connections to be connected to filter assembly 100 in a vertical direction. This provides vertical access to fluid lines which allows filter assembly 100 to be positioned in locations having tight tolerances or minimal space. As illustrated, fuel or fluid connections 120, 124 run vertically down filter assembly 100 through partially circular shaped recessed portions 112 of ends of lower mounting surface portion 110 of housing 102.

The non-circular cross-sectional configuration of central portion 108 of housing 102 is further illustrated in FIGS. 2 and 3. A front view of filter assembly 100 is depicted in FIG. 2 and a side view of filter assembly 100 is depicted in FIG. 3. Upper portion 106 of housing 102 is configured having a generally circular cross-sectional configuration or shape. Central portion 108 of housing 102 is configured having a generally non-circular cross-sectional configuration or shape. In the illustrated example, central portion 108 has a generally oval or elliptical cross-sectional configuration or shape.

Figure 4:
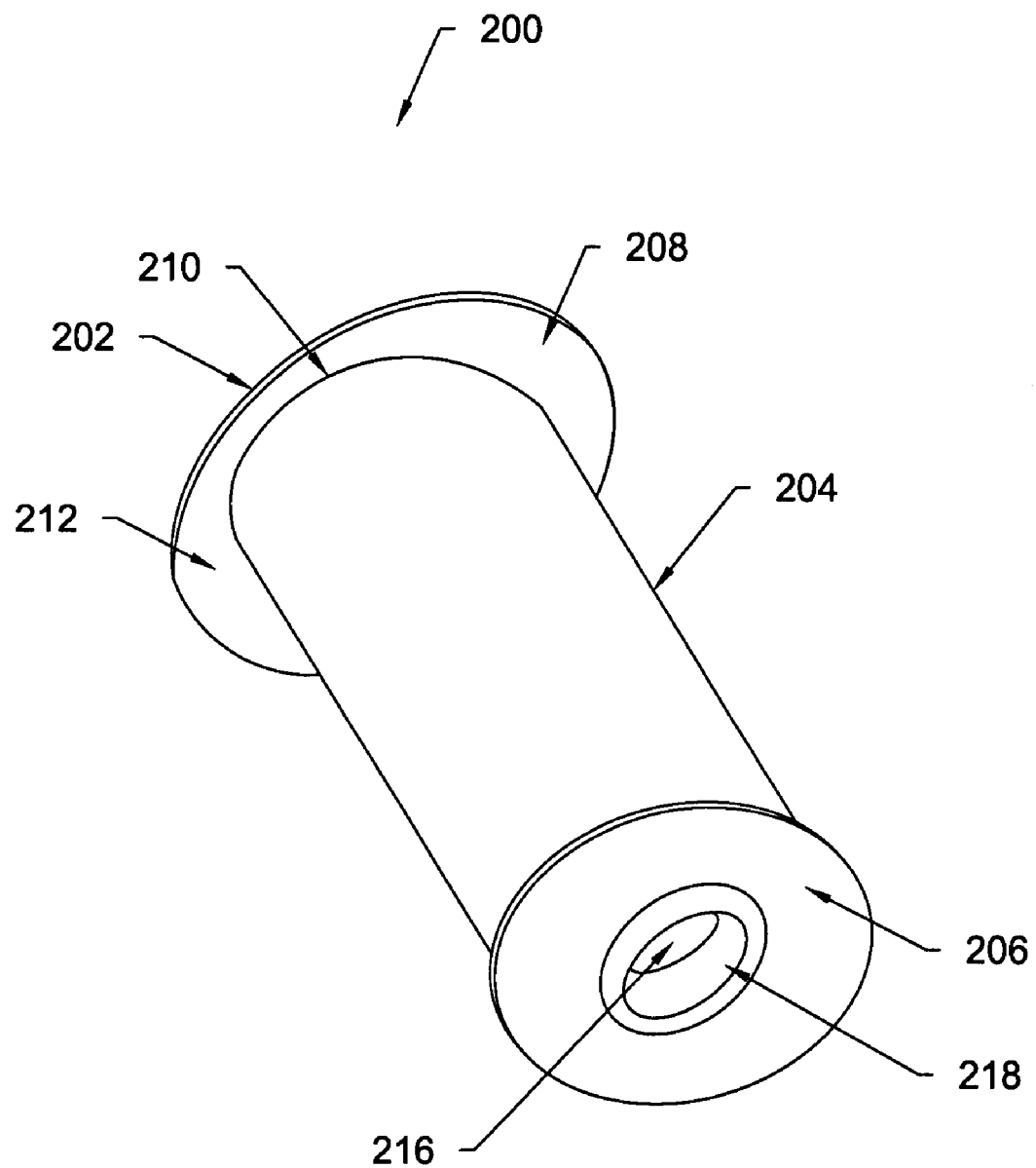
FIG. 4 is a perspective view of an exemplary fuel filter cartridge.
Figure 5:
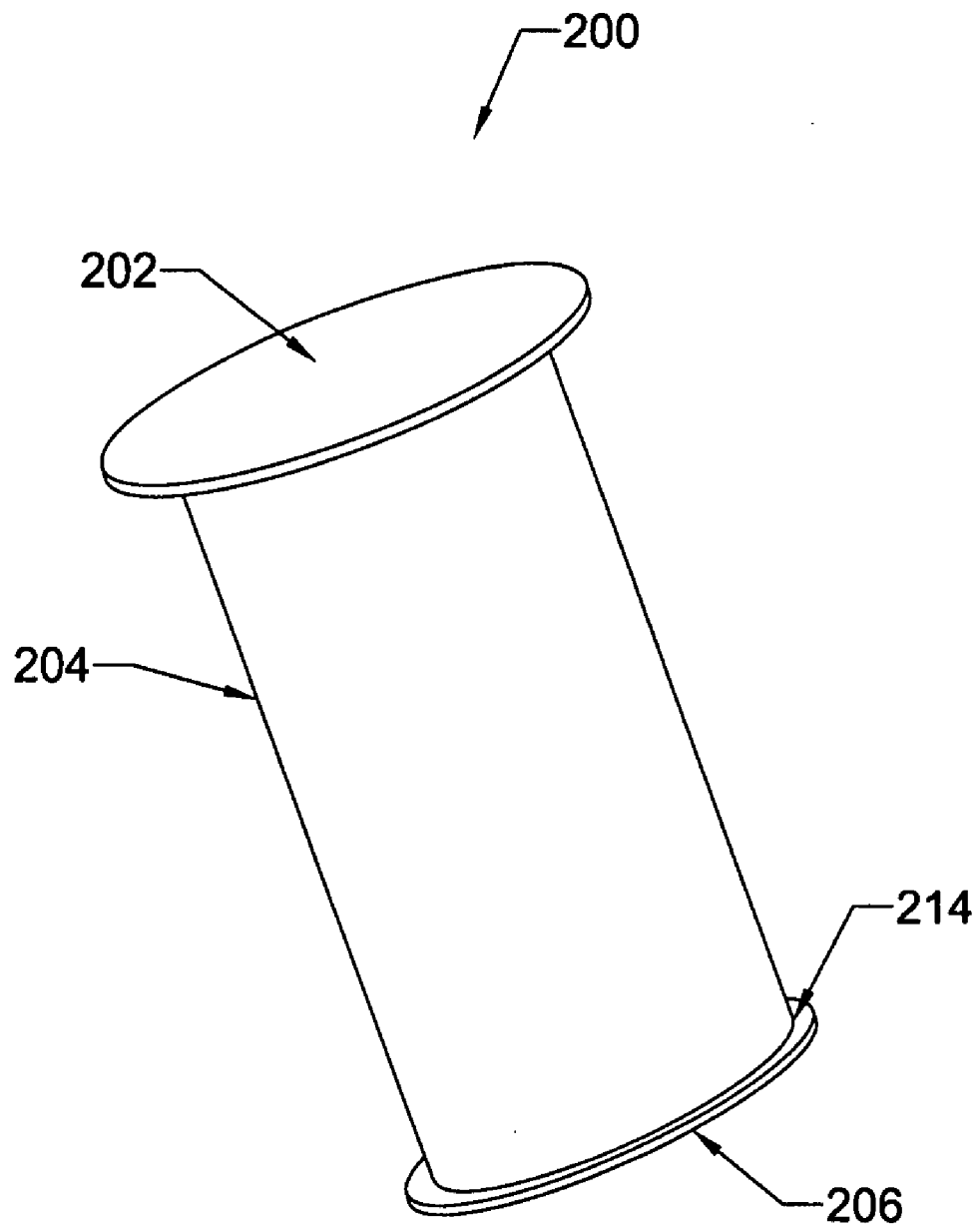
FIG. 5 is an alternate perspective view of FIG. 4.

Referring collectively to FIGS. 4 and 5, filter assembly 100 includes a replaceable filter cartridge 200 that is positioned within an interior portion of housing 102. Filter cartridge 200 includes a top endplate 202, a filter media 204, and a lower endplate 206. Top endplate 202 has a generally circular configuration or shape and has a lower surface 208 that is connected with an upper end 210 of filter media 204. The diameter of circular shaped top end plate 202 is larger than the overall cross-sectional size of filter media 204 such that peripheral edge 212 of top end plate 202 extends beyond the outer edges or periphery of filter media 204.

Filter media 204 has a generally oval or elliptical cross-sectional configuration or shape that generally matches the configuration or shape of central portion 108 of housing 102. In one form, filter media 204 comprises a meltblown media, an air-laid media, a wet-laid media or a synthetic blend of one or more of the media types. Lower end plate 206 has a generally oval or elliptical cross-sectional configuration. Lower end 214 of filter media 204 is connected with an upper surface of lower end plate 206. Lower end plate 206 also includes aperture 216 located at approximately the center of lower end plate 206. Seal 218 is positioned around aperture 216. As set forth in greater detail below, filter cartridge 200 can be removably positioned in a fluid chamber defined by the interior of housing 102.

Figure 6:
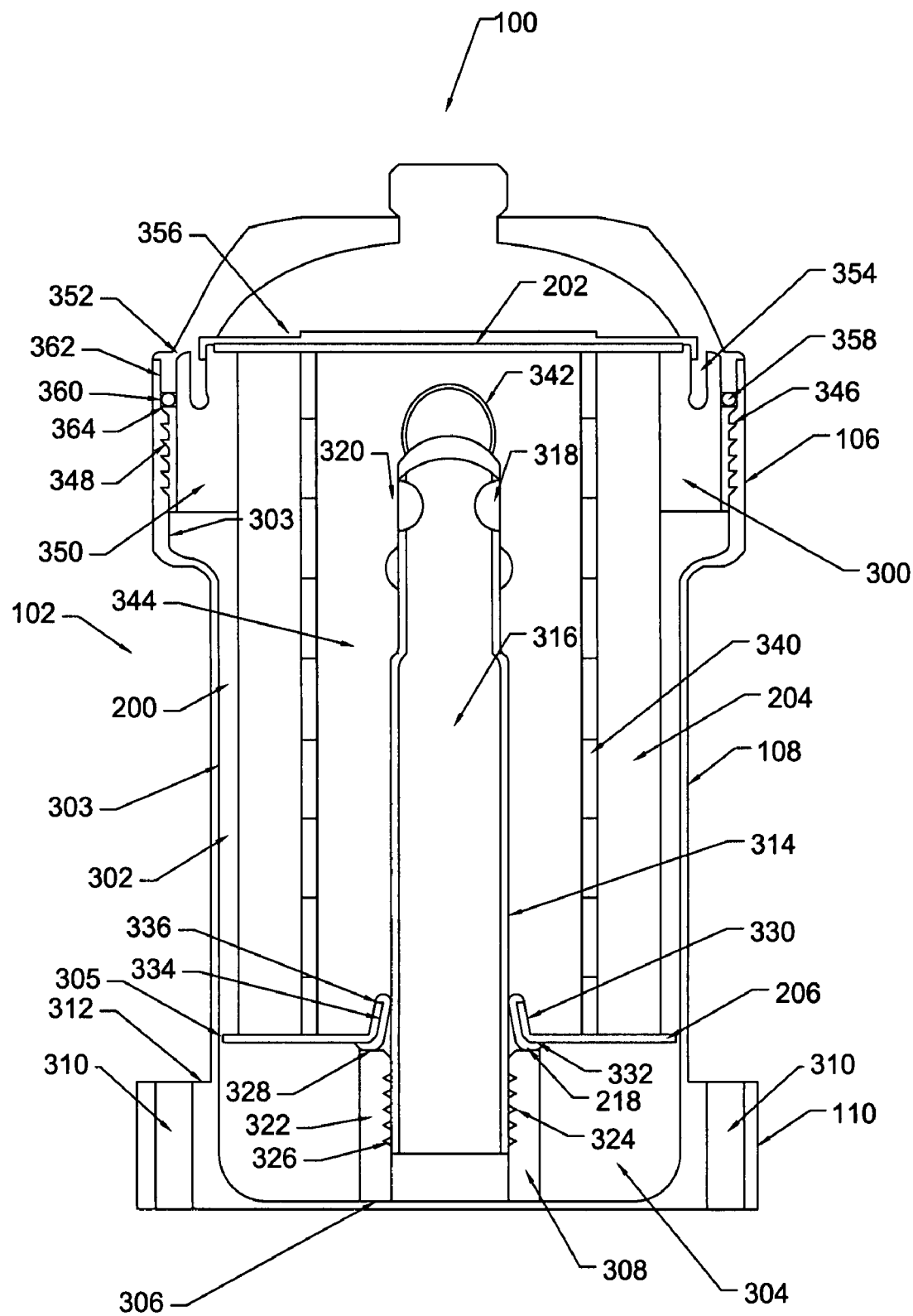
FIG. 6 is a cross-sectional view of FIG. 4.

Referring to FIG. 6, a cross-sectional view of filter assembly 100 is illustrated. Upper portion 106 of housing 102 defines first fluid chamber 300 and central portion 108 of housing 102 defines second fluid chamber 302. First fluid chamber 300 is generally cylindrical or circular in shape and transitions into second fluid chamber 302, which has a generally non-circular shape or configuration. First and second fluid chambers 300, 302 house filter cartridge 200. Filter media 204 of filter cartridge 200 is spaced apart from internal wall 303 of upper portion 106 and central portion 108 of housing 102 a desired distance.

Lower mounting surface portion 110 of housing 102 and lower end plate 206 of filter cartridge 200 define a third fluid chamber 304, which is illustrated as having a generally non-circular shape. In the illustrated example, a smooth transition is illustrated between third fluid chamber 304 and second fluid chamber 302. As such, third fluid chamber 304 generally has the same shape as second fluid chamber 302. However, in alternative forms, third fluid chamber 304 may take many different forms or shapes such as, for example, oval, elliptical, circular, square, rectangular and so forth. In some fluid applications, such as diesel fuel for example, third fluid chamber 304 provides a location in which water that is removed from the fuel may be collected. A small space or gap 305 is located between the outer edge of lower end plate 206 and internal wall 303 of central portion 108 of housing 102 that allows water to travel to third fluid chamber 304. Although not illustrated, a lower end of lower mounting surface portion 110 may include a valve that allows a user to drain water that has been removed from the fuel from third fluid chamber 304.

A lower surface 306 of the lower mounting surface portion 110 of housing 102 includes a connection member 308. As illustrated, the connection member 308 protrudes upwardly a predetermined distance from lower surface 306 of lower mounting surface portion 110. Connection member 308 is circular in shape in the illustrated example, but may be formed having other shapes in alternative forms. Lower mounting surface portion 110 includes at least one aperture 310 running through the outer edges of a mounting segment or portion 312 of lower mounting surface portion 110. Aperture 310 allows filter assembly 100 to be connected with a vehicle by a bolt or another equivalent connection device.

Filter assembly 100 also includes a center post 314 that protrudes upwardly along a vertical axis from connection member 308. In the illustrated form, center post 314 protrudes up through second fluid chamber 302 defined by central portion 108 of housing 102 and into first fluid chamber 300 defined by upper portion 106 of housing 102. Center post 314 includes hollow interior 316 and at least one aperture 318 located on upper portion 320 of center post 314. Aperture 318 allows fluid that has been filtered by filter media 204 to pass into hollow interior 316 of center post 314. Lower portion 322 of center post 314 includes an externally threaded segment 324 that is used to secure center post 314 to an internally threaded segment 326 of connection member 308. Lower portion 322 of center post 314 could be secured to connection member 308 using various other connection methods.

Filter cartridge 200 is fixedly secured in housing 102 by placing aperture 216 of filter cartridge 200 on upper portion 320 of center post 314 and forcing filter cartridge 200 downwardly until seal 218 of lower end plate 206 makes contact with upper portion 328 of connection member 308. Seal 218 provides a fluid tight seal between lower end plate 206 and center post 314. As illustrated, lower end plate 206 includes an upwardly extending circular shaped rib 330 that defines aperture 216 of lower end plate 206. Seal 218 is connected with lower surface 332 of lower end plate 206, outer surface 334 of the rib 330, and upper surface 336 of rib 330. As previously set forth, lower surface 336 of lower end plate 206 and lower surface 306 of lower mounting surface portion 110 define third fluid chamber 304. In alternative forms, center post 314 may include a connection member that provides a fluid tight seal with lower end plate 206.

As further illustrated in FIG. 6, the filter cartridge 200 includes a centertube 340. Centertube 340 runs substantially parallel with filter media 204 and housing 102 along a vertical axis of filter assembly 100. Centertube 340 includes a plurality of apertures 342 that allow fuel to pass into an internal fluid chamber 344 of filter cartridge 200. Filtered fluid from internal fluid chamber 344 may then enter hollow interior 316 of center post 314 through apertures 318 in center post 314. An upper surface of lower end plate 206 is connected with a lower end of centertube 340 and a lower surface of upper end plate 202 is connected with an upper end of centertube 340. Filter media 204 is wrapped, positioned, or otherwise connected around or with the outside surface of centertube 340.

Lid 104 is removably connected with upper portion 106 of housing 102. Once filter cartridge 200 is placed over center post 314, lid 104 may then be connected with upper portion 106 of housing 102. In one form, lid 104 includes an externally threaded segment 346 that screws into an internally threaded segment 348 of upper portion 106 of housing 102. The externally threaded segment 246 of lid 104 is located on lower portion 350 of lid 104. The outside diameter of lower portion 350 of lid 104 is somewhat smaller than the inside diameter of upper portion 106 of housing 102.

A central portion 352 of lid 104 includes a retaining clip 354 and an upper internal surface 356. Retaining clip 354 protrudes downwardly a predetermined distance from upper internal surface 356. As lid 104 is screwed into upper portion 106 of housing 102, upper end plate 202 of filter cartridge 200 snaps or passes through retaining clip 354. As lid 104 continues to be screwed into upper portion 106 of housing 102, upper end plate 202 of filter cartridge 200 eventually makes contact with upper internal surface 356 of lid 104. Center post 314 and lid 104 thereby cooperate with one another to securely hold filter cartridge 200 within first and second fluid chambers 300, 302 defined by housing 102. In alternative forms, lid 104 may be secured to upper portion 106 of housing 102 using a quarter turn lid (bayonet), a friction fit, or the illustrated threading arrangement could be reversed.

A seal 358 is positioned within a groove or notch 360 of lid 104 and is used to form a fluid tight seal between an outside edge 362 of lid 104 and an inside edge 364 of upper portion 106 of housing 102. Referring back to FIGS. 1-3, lid 104 includes a dome shaped cap portion 150 that includes a plurality of gripping members 152 protruding upwardly from the dome shaped cap portion 150. At the top of dome shaped cap portion 150 is a tool attachment member 154. Gripping members 152 allow an installer to use their hands to begin to tighten lid 104 onto housing 102 and after reaching a certain tightening point, a tool may be placed on tool attachment member 154 to further tighten lid 104 on to an upper edge 156 of upper portion 106 of housing 102.

Figure 7:
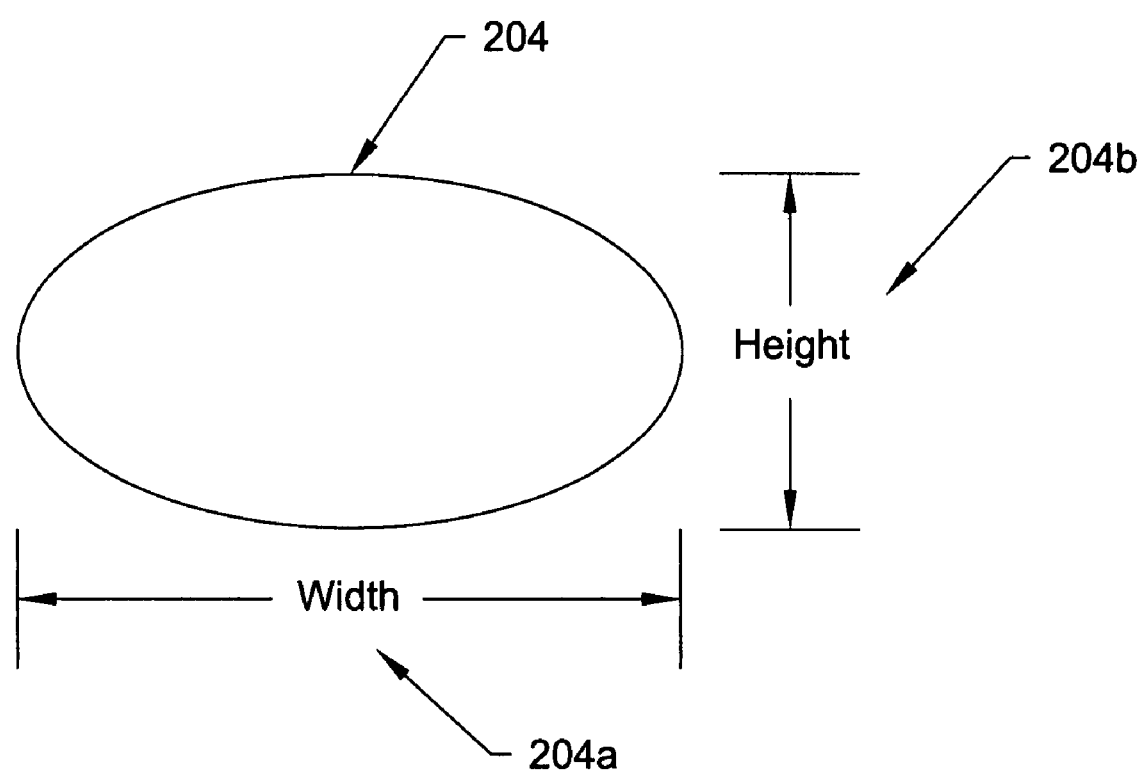
FIG. 7 is a cross-sectional view of an exemplary filter media.

Referring to FIG. 7, a top cross-sectional view of a portion of filter media 204 of filter cartridge 200 is illustrated. As depicted, filter media 204 has a predetermined width 204a and a predetermined height 204b. In addition, filter media 204 has a non-circular shape, which is illustrated as being oval or elliptical shaped in this form. In one form, the oval size is such that the ratio of predetermined height 204b in relation to predetermined width 204a is 0.9 or less. Central portion 108 of housing 102 and center tube 340 have a similar size configuration as well as shape.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A filter assembly, comprising:
    a housing having a circular shaped upper portion, a non-circular shaped central portion, and a lower portion, wherein the circular shaped upper portion and the non-circular shaped central portion are coupled with each other in a serial connection along a vertical axis of the housing and define a fluid chamber, the circular shaped upper portion includes a lower shelf having a fluid inlet port,
    the lower shelf extending from a non-circular periphery to a circular periphery, the lower shelf connecting to the non-circular shaped central portion at the non-circular periphery and connecting to the circular shaped upper portion at the circular periphery, the fluid inlet port being accommodated between the circular periphery and the non-circular periphery, the projection of the fluid inlet along the vertical axis being radially within the circular periphery and being radially out of the non-circular periphery, and the lower shelf extending outwardly from the non-circular shaped central portion such that an extra space outside the housing is provided under the upper portion and beside the central portion to receive the fluid inlet port;
    a non-circular shaped filter cartridge positioned within the fluid chamber of the housing, the non-circular shaped filter cartridge having a non-circular shaped centertube and a non-circular shaped filter media, the non-circular shaped filter media being positioned around the non-circular shaped centertube; and
    a lid connected with an upper end of the circular shaped upper portion of the housing.

2. The filter assembly of claim 1, wherein the fluid inlet port is positioned in a vertical orientation in relation to the vertical axis of the housing.

3. The filter assembly of claim 2, wherein the fluid inlet port includes a first connection segment that protrudes downwardly from the lower shelf.

4. The filter assembly of claim 2, wherein the lower shelf includes a fluid outlet port generally located on an opposite side of the fluid inlet port that is positioned in a vertical orientation in relation to the vertical axis of the housing.

5. The filter assembly of claim 4, wherein the fluid outlet port includes a second connection segment that protrudes downwardly from the lower shelf.

6. The filter assembly of claim 1, wherein the non-circular shaped filter media includes a circular shaped top endplate connected with an upper interior surface of the lid.

7. The filter assembly of claim 1, further comprising a center post connected with a connection member positioned within an interior portion of the lower portion of the housing.

8. The filter assembly of claim 7, wherein the non-circular shaped filter cartridge includes a lower non-circular shaped endplate having a central aperture, an outside surface of a sealing member being positioned around at least a portion of the central aperture, and an inside surface of the sealing member being positioned around at least a portion of an outside diameter of the center post.

9. A filter, comprising:
    a housing defining an upper generally circular cross-section shaped chamber and a lower generally non-circular cross-section shaped chamber in a serial connection along a vertical axis of the housing, the housing having a shelf portion where the upper generally circular cross-section shaped chamber transitions to the lower generally non-circular cross-section shaped chamber,
    the shelf portion extending from a non-circular periphery to a circular periphery, the shelf portion connecting the lower chamber at the non-circular periphery and connecting to the upper chamber at the circular periphery, the shelf portion including a fluid inlet port being accommodated between the circular periphery and the non-circular periphery, the projection of the fluid inlet port along the vertical axis being radially within the circular periphery and out of the non-circular periphery, and the shelf portion extending outwardly from the lower chamber such that an extra space outside the housing is provided under the upper chamber and beside the lower chamber to receive the fluid inlet port of the shelf portion;
    a center post protruding upwardly from a connection member located on a lower surface of the lower generally non-circular cross-section shaped chamber;
    a non-circular shaped filter cartridge having an upper end plate and a non-circular shaped lower end plate, and a non-circular shaped centertube extending from the upper end plate to the lower end plate, wherein the non-circular shaped filter cartridge is connected with the center post; and
    a lid connected with an upper portion of the upper generally circular cross-section shaped chamber.

10. The filter of claim 9, wherein the shelf portion has a generally circular shape.

11. The filter of claim 10, wherein the fluid inlet port of the circular shaped shelf portion is positioned parallel to the vertical axis of the upper generally circular cross-section shaped chamber and the lower generally non-circular cross-section shaped chamber, and the circular shaped shelf portion further includes a fluid outlet port positioned parallel to the vertical axis of the upper generally circular cross-section shaped chamber and the lower generally non-circular cross-section shaped chamber.

12. The filter of claim 9, wherein the lid includes a retaining clip located on an upper interior portion of the lid that secures the upper end plate within the lid.

13. The filter of claim 9, wherein the non-circular shaped lower end plate of the filter cartridge rests on an upper surface of the connection member to define a fluid reservoir in a lower portion of the lower generally non-circular cross-section shaped chamber.

14. The filter of claim 9, wherein the non-circular shaped lower end plate includes an aperture, wherein a seal is positioned between the aperture and the center post thereby sealing an upper surface of the connection member to a lower surface of the non-circular shaped lower end plate.

15. The filter of claim 9, wherein the center post includes at least one aperture located on an upper portion of the center post, wherein the center post includes a hollow interior thereby defining a fluid chamber within an interior portion of the center post.

16. A fuel filter cartridge, comprising:
a circular shaped top endplate;
a non-circular cross-section shaped centertube having an upper end connected with a lower surface of the top endplate and a plurality of fuel passing apertures;
a non-circular cross-section shaped filter media suitable for filtering fuel positioned around the non-circular cross-section shaped centertube; and
a non-circular shaped lower endplate having an upper surface connected with a lower end of the non-circular cross-section shaped centertube,
wherein the centertube extends from the top endplate to the lower endplate, the circular shaped top endplate is solid with no aperture, the non-circular shaped lower endplate includes an upwardly protruding rib that defines a central aperture in the lower endplate; and the lower end of the centertube surrounds and is spaced from the central aperture so that there is a gap between the central aperture and the lower end of the centertube.

17. The fuel filter cartridge of claim 16, wherein a seal is mounted to a lower surface of the non-circular shaped lower endplate and the upwardly protruding rib.

18. The fuel filter cartridge of claim 16, wherein the non-circular cross-section shaped centertube and the non-circular cross-section shaped filter media are oval shaped.

19. The fuel filter cartridge of claim 16, wherein the non-circular cross-section shaped filter media has a predetermined cross-sectional width and a predetermined cross-sectional height, wherein the ratio of the predetermined cross-sectional height in relation to the predetermined cross-sectional width is equal to 0.9 or less.

20. The filter assembly of claim 1, wherein the non-circular periphery is generally an oval, the oval has a width and a height shorter than the width, the diameter of the circular periphery is larger than the width and the height of the oval, and the fluid inlet port is positioned on a width side of the oval.

21. The filter of claim 9, wherein the non-circular periphery is generally an oval, the oval has a width and a height shorter than the width, the diameter of the circular periphery is larger than the width and the height of the oval, and the fluid inlet port is positioned on a width side of the oval.

* * * * *